Aug. 7, 1934.   S. Y. TAYLOR ET AL   1,969,109
COMBINATION BALE TIE AND HOLDER
Filed Nov. 20, 1933

S. Y. TAYLOR
J. P. CORKERY
Inventor

Jesse R. Stone
& Lester B. Clark

By

Attorneys

Patented Aug. 7, 1934

1,969,109

UNITED STATES PATENT OFFICE 1,969,109

COMBINATION BALE TIE AND HOLDER

Sam Y. Taylor and Joseph P. Corkery, Houston, Tex., assignors to Houston Compress Company, a corporation of Texas Application November 20, 1933, Serial No. 698,810

16 Claims. (Cl. 24—20)

The invention relates to an improvement in a combination bale tie and holder of the type generally used in confining cotton and similar materials in bale form.

There are a considerable number of bale ties and holders now in general use wherein the bale tie or strap has attached to one end thereof what is known as a buckle. When the tie is placed around the bale the free end is passed through the buckle and bent so that the pressure of the cotton tends to hold the free end in position. It has been found in practice, however, that this arrangement is not entirely satisfactory because of the enormous pressure of the compressed cotton. It is imperative when a bale of cotton is compressed to a predetermined density that the bale ties properly retain it as it is compressed so that the density thereof will be retained. With the bale tie and buckle arrangement it is generally well known that a creeping action occurs. In other words, the bale tie gradually slips around the buckle and permits the baled cotton to expand slightly. This results in a loss in density of the bale and in many instances the ties slip free from the buckle and release the bale entirely.

With a view of correcting the defects in the previous structures the present device has been conceived in order to provide a bale tie which will not release in any manner whatever.

It is one of the objects of the invention to form a combination bale tie and holder of a single piece of material.

Another object of the invention is to provide a buckle on the end of the bale tie which buckle is made up by bending and crimping the end of the tie member.

Another object of the invention is to provide a combination bale tie and holder which may be readily fixed to the bale by merely inserting the free end of the bale tie in the opposite end thereof, which has previously been bent to form a holder.

A still further object of the invention is to provide a holder for bale ties which will not cause shearing of the tie and will remain in fixed position indefinitely.

It is also an object of the invention to provide a novel method of forming a bale tie and holder of a unitary strip of material.

Other and further objects of the invention will be readily apparent when the following description is considered in connection with the accompanying drawing wherein.

Figure 1:
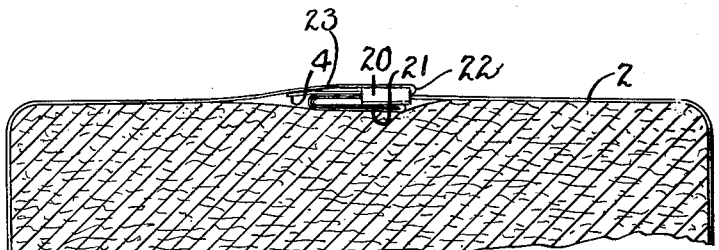
Fig. 1 is a sectional view showing one of the devices in position about a bale.

A bale having the tie 2 passed therearound is seen in Fig. 1. This tie is made up of the usual type of strap metal which is seen in section in Fig. 6, enlarged to twice its normal size.

Figure 2:
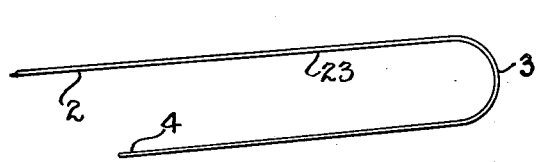
Fig. 2 is a side elevation showing the manner of bending the free end of the tie member so that it may be inserted in the holder.

The cotton is compressed in a suitable press and a plurality of tie members are passed around the bale and attached thereto in order to confine the cotton. It is intended that the present invention will embody a combination bale tie and holder wherein the holder is formed by bending one end of the tie member so that it will receive and firmly hold the opposite end of the tie member. In Fig. 2 what is known as the free end of the tie member is illustrated as having been bent at the point 3 so that the end 4 thereof will normally lie underneath the straight portion of the tie member.

It is obvious that the bend at 3 may be made by the operator at the time the bale is being applied to the cotton in order to determine the length of the tie, depending upon the size of the bale. It is understood that the tie member is made of more or less spring metal which can easily be bent by hand.

Figure 4:
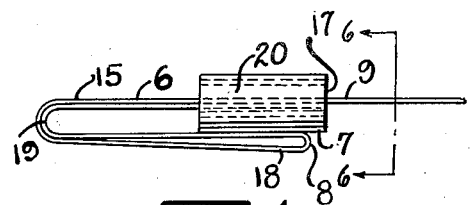
Fig. 4 is a side elevation of the holder end of the bale tie and illustrating how that end has been bent in order to receive the free end, it being understood that Figs. 2 and 4 are fragmentary views of opposite ends of the same tie member.
Figure 3:
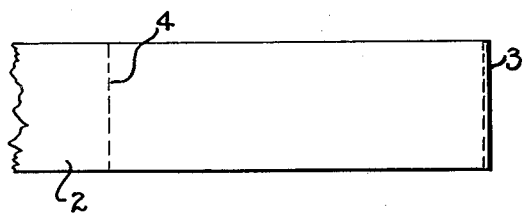
Fig. 3 is a top plan view of the free end shown in Fig. 2.
Figure 5:
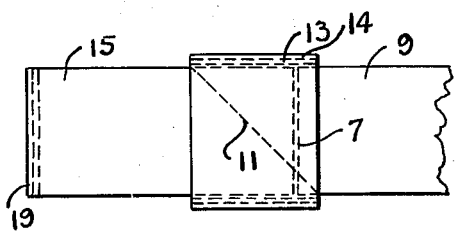
Fig. 5 is a top plan view of Fig. 4.
Figure 7:
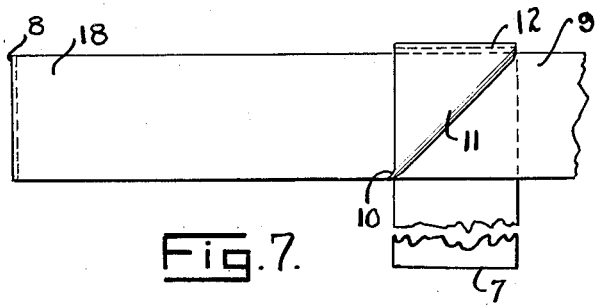
Fig. 7 shows the end of the bale tie being bent to form the holder, as viewed when the holder is only partially formed and from the under side thereof.
Figure 6:
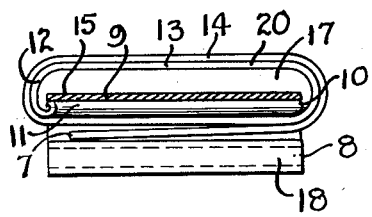
Fig. 6 is a section taken on the line 6—6 of Fig. 4 and looking into the holder.

The opposite end of the tie member is bent as seen in Fig. 4 to form a holder to receive the free end 4. To accomplish this, one end 6 of the tie member 2 is formed with a sharp reverse bend 8 so that the extreme end 7 extends back reversely underneath the body portion 9 of the end 6 for a considerable length. Reference may be had to Fig. 7, which is a view looking at the under side of the holder end of the tie member as the holder is being formed. The end 7 has been bent reversely at 8 underneath the portion 9 so that it lies closely adjacent the portion 9. At approximately the point 10 the tie member is bent at an angle of 90°, so that it extends transversely with respect to the tie member. This forms a fold 11 which extends across the underside of the tie member at an angle of 45°. Following the making of this fold, the end 7 is carried around the portion 9 of the tie member, as seen in Fig. 6, to form the bend 12. The end 7 is of sufficient length so that almost two complete coils, such as 13 and 14, will be formed around the portion 9 of the tie member. The extreme end 7 terminates on the underside of the tie member and is as seen in Fig. 6.

The coils 13 and 14 will be seen as spaced from the outer surface 15 of the portion 9 in order to form a pocket 17. It is this pocket that is adapted to receive the free end 4 of the tie member.

In order that the coils will remain in this set position when subjected to the enormous stresses of the expanding cotton, the reversely bent portion 18 of the end 6 is bent underneath itself, as seen in Fig. 4, so that the portion 18 thereof will lie underneath the holder 20, which has been formed by the coils 13 and 14. This step in the forming of the device creates the bend 19. It seems obvious that when the tie is attached to the bale the pressure of expansion of the cotton will create a pressure at 21 in Fig. 1 to hold the end 18 against the end 7 so that there can be no movement of the holder.

In operation it is only necessary for the person attaching the bale to bend the free end 4, as at 3, and hook it into the pocket 17, it being understood that the bend 3 will be made so that the proper length of the tie to encircle the bale will be had. When the pressure is relieved from the bale the cotton will expand to create a pressure against the end 18, as at 21, and the stress will then cause the free end to pull tight in the holder so that the bend 3 will take the form of a sharp reverse bend such as shown at 22 in Fig. 1 to closely overlie the holder or socket 20.

In view of the fact that such a sharp bend 22 is formed, it is impossible for the free end 4 to creep out of the holder. It will also be observed, in Fig. 1, that the free end 4 is confined between the outer surface 15 of the holder end of the tie and the under surface 23 of the free end of the tie, so that there is a metal to metal friction between at least two surfaces at this point. This at least doubles the friction which must be overcome in order to permit a creeping of the tie member as compared with previous fastenings for the bale tie.

While the holder or buckle is shown enlarged for purposes of illustration in Fig. 6, it will be understood that the socket 17 is of just sufficient size to receive the end 4 of the tie, so that when the tie takes the load of the expanding cotton there is almost a straight line pull across the holder. There is a slight tilting of the holder, however, which tends to move the crimped part 22 out away from the bale; the double coils 13 and 14, resist this, however. The tilting serves a useful purpose because this movement causes the other side of the coils to press against the end 4 so that it is securely gripped and cannot slip or creep. A test, wherein all but the two end and center ties on a high density bale were removed, so that a single tie was holding the half of the bale, has been made. Under this enormous stress there was no creeping. No other bale tie known could withstand this test.

The present invention is simple and ecomonical in its operation and contruction, because of the fact that it is made up entirely from the tie member itself and provides the double coils 13 and 14 to resist the pulling stress of the tie member. Thus a double strength is obtained at the point where there is a shearing action so that the holder is strong and sturdy and has been found in practice to securely hold the compressed material in place without any creeping action whatever.

What we claim as new is:

1. A combination bale tie and holder comprising a tie member, a socket formed of a plurality of wrappings of the tie member about itself adjacent one end of said member, said socket being adapted to receive the other end of said member.

2. A combination bale tie and holder comprising a single tie member, one end of said member being twice coiled about itself to form a holder, the other end of said member being recurved to be received in said socket.

3. A bale tie comprising a strip of metal, one end being recurved, the other end being rebent on the strip and wrapped to encircle the strip, a holder formed by said wrapped end which is adapted to receive and hold said recurved end.

4. A bale tie having a holder on one end thereof, said holder comprising a recurved portion and a coil portion encircling the tie to form a socket.

5. A bale tie having a holder on one end thereof, said holder comprising a recurved portion, a coil portion encircling the tie to form a socket, said recurved portion being inwardly bent to contact the coil portion when said tie is engaged about the bale.

6. A device of the character described including a metal strip, one end of said strip being reversely bent under and a portion coiled about the strip to form a buckle, said reversely bent portion being bent to underlie said coiled portion to hold the coiled portion in position.

7. A device of the character described including a metal strip, one end of said strip being reversely bent under, and a portion coiled about the strip to form a buckle, said reversely bent portion being again bent to underlie said coiled portion to hold the coiled portion in position, the other end of said strip being bent to be received by said buckle.

8. A bale tie comprising a unitary strip of flexible metal, a buckle formed of one end of the metal strip rebent and passed completely around the strip and adapted to grip the other end of said strip.

9. A bale tie and holder comprising a reversely bent and coiled portion on one end of the strip comprising a socket, a bend in the other end of the strip so that such end may be received in said socket and positioned between the strip and said coiled portion whereby slipping of the tie is avoided.

10. A method of forming a combination bale tie and holder from a unitary strip of sheet metal comprising the steps of reversely bending one end of the tie beneath itself, folding the bent end across the tie and wrapping it about the tie, bending the reversely bent part underneath the wrapped portion so that the expanding bale will press it against the wrapped portion.

11. A method of forming a combination bale tie and holder from a unitary strip of sheet metal comprising the steps of reversely bending one end of the tie beneath itself, folding the bent end across the tie and wrapping it about the tie, bending the reversely bent part underneath the wrapped portion so that the expanding bale will press it against the wrapped portion, and bending the other end into a hook to be passed under the wrapped portion.

12. A method of forming a combination bale tie and holder from a unitary strip of sheet metal comprising the steps of reversely bending one end of the tie beneath itself, folding the bent end across the tie and twice wrapping it about the tie, bending the reversely bent part underneath the wrapped portion so that the expanding bale will press it against the wrapped portion.

13. A tie composed of a single strip of metal, one end portion of the strip being doubled back upon itself, the extreme end of this bent portion bent bent transversely of the strip and carried around the strip to completely encircle the strip and form with the strip an enclosed opening, the extreme end terminating on the under side of the encircling portion, the doubled back end being again bent to under lie said end and be pressed thereagainst when the tie is in use.

14. A tie composed of a single strip of metal, one end portion of the strip being doubled back upon itself, the extreme end of this bent portion being bent transversely of the strip and carried around the strip to completely encircle the strip and form with the strip an enclosed opening, the extreme end terminating on the under side of the encircling portion, the doubled back end being again bent to under lie said end and be pressed thereagainst when the tie is in use, and the other end of said tie being doubled upon itself so that the inwardly doubled end may be inserted in said opening.

15. A combination bale tie and buckle including a coiled portion encircling the tie member, the other end of said tie being inserted in said coiled portion so that when pressure is applied to the tie that said coiled portion will tilt to restrain said end against slipping.

16. A bale tie including a metal strip, a coil transversely encircling said strip to form a buckle, the end of the encircling portion being disposed on the under side so that pressure against the coil holds the end in position.

SAM Y. TAYLOR.
JOSEPH P. CORKERY.